(12) United States Patent
Bologeorges (10) Patent No.: US 8,382,310 B2
(45) Date of Patent: Feb. 26, 2013

(54) PACKAGING SYSTEM FOR THE RETAIL SALE OF AN ELECTRICAL DEVICE

(75) Inventor: James P. Bologeorges, Libertyville, IL (US)

(73) Assignee: Smart Solar Inc., Libertyville, IL (US)

(*) Notice: Subject to any disclaimer, the term of this patent is extended or adjusted under 35 U.S.C. 154(b) by 339 days.

(21) Appl. No.: 12/834,763

(22) Filed: Jul. 12, 2010

(65) Prior Publication Data

US 2011/0007499 A1 Jan. 13, 2011

Related U.S. Application Data

(60) Provisional application No. 61/225,135, filed on Jul. 13, 2009.

(51) Int. Cl.
*F21L 4/00* (2006.01)

(52) U.S. Cl. ........ 362/183; 362/154; 362/253; 362/394; 362/802; 136/243; 136/244; 320/101

(58) Field of Classification Search .................. 362/154, 362/183, 253, 394, 802; 136/243, 244; 320/101
See application file for complete search history.

(56) References Cited

U.S. PATENT DOCUMENTS

2009/0078604 A1 3/2009 Richmond

*Primary Examiner* — Stephen F Husar
*Assistant Examiner* — Meghan Dunwiddie
(74) *Attorney, Agent, or Firm* — McDonnell Boehnen Hulbert & Berghoff (57) ABSTRACT

A packaging system for the retail display of an electrical device is disclosed. The packaging includes a "try me" switch to allow a potential customer to activate the electrical device in the store. The product includes a photovoltaic array and rechargeable battery which is intended to be periodically charged by the photovoltaic array. When packaged by the manufacturer, the rechargeable batteries are sufficiently charged to substantially activate the electrical device. When depressed, the "try me" switch interconnects the primary rechargeable battery with the electrical device within the packaging.

22 Claims, 7 Drawing Sheets

PACKAGING SYSTEM FOR THE RETAIL SALE OF AN ELECTRICAL DEVICE

BACKGROUND

Electrical products sold to consumers often have printed on their packaging an indication that the consumer may, before purchasing the item, activate the device and see how it performs. Such arrangements are often associated with a "try me" button. Such a button allows a customer in a retail store to push a portion of the packaging and see the device operate while the package is still on a retail store shelf.

When activated by the consumer, a "try me" button often interconnects a supplemental battery to the electrical device or a portion of it. If, for example, the electrical product is a series of lights, pushing the "try me" button may interconnect a supplemental battery with, e.g., a few of the lights. Such lights will temporarily illuminate in the retail store for the potential customer, giving the potential customer a better sense of how the device operates. After being purchased, the customer typically disposes of both the "try me" button and the supplemental battery.

OVERVIEW

A packaging system for electrical products is disclosed. A substantial number, or all, of the electrical components of the product to be purchased can be activated through the use of a "try me" button in a store. However, there is reduced, or no, reliance on a supplemental battery, which a purchaser typically disposes of, along with the "try me" button and the rest of the device packaging.

DESCRIPTION

Disclosed herein is a preferred embodiment for the packaging of an electrical device, such as, by way example and not by way of limitation, a string of LED lights. However, it should be understood that any teachings herein may apply to other types of retail store displays for electrical devices and that the illustration below should not be construed as limiting the scope of the invention.

Figure 1:
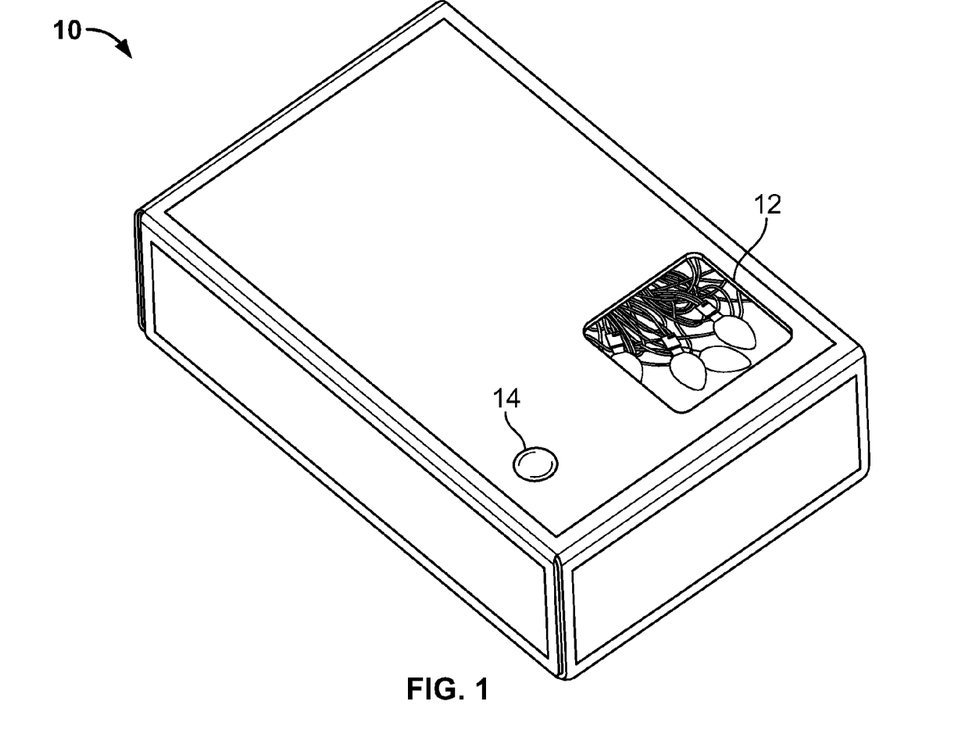
FIG. 1 is a perspective view of packaging using the present system.
Figure 2:
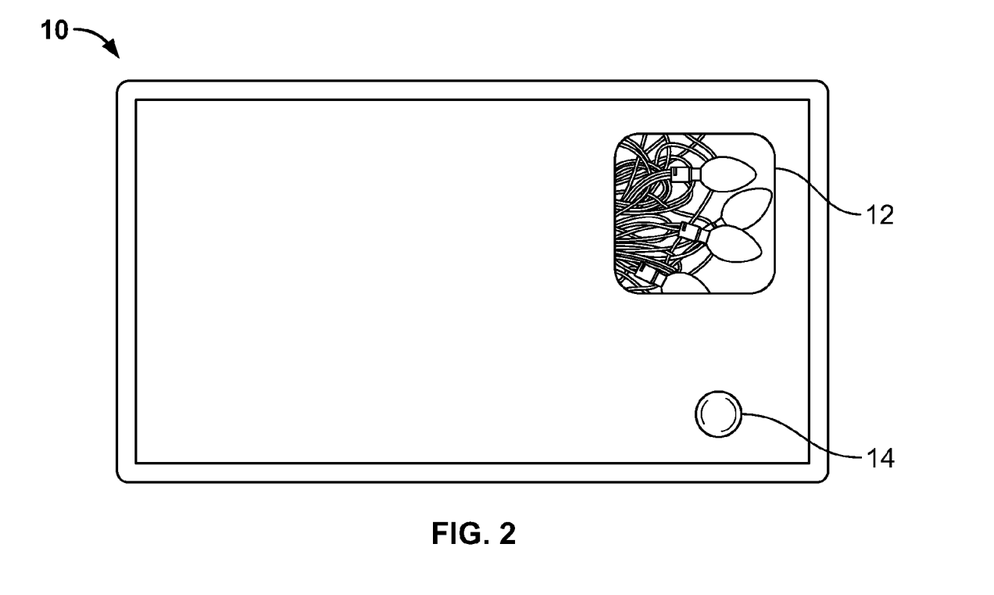
FIG. 2 is a top plan view of packaging using the system of FIG. 1.

Referring to FIGS. 1 and 2, a box 10 is shown using the packaging system of the present system. The box includes an electrical device such as, for example, a string of light emitting diode (LED) lights enclosed therein. The box includes both a substantially transparent window 12 and a depressible, "try me" portion 14. The "try me" portion 14 may be, for example, in the form of a button, tab, area or the like. When pressed, the depressible portion activates a switch below it. Alternatively, of course, the box 10 could include a hole so that a consumer could more directly press the switch. Also, of course, the clear display 12 may be of a larger or smaller size to allow a greater or lesser amount of the electrical device or contents inside to be shown to the potential purchaser.

Figure 3:
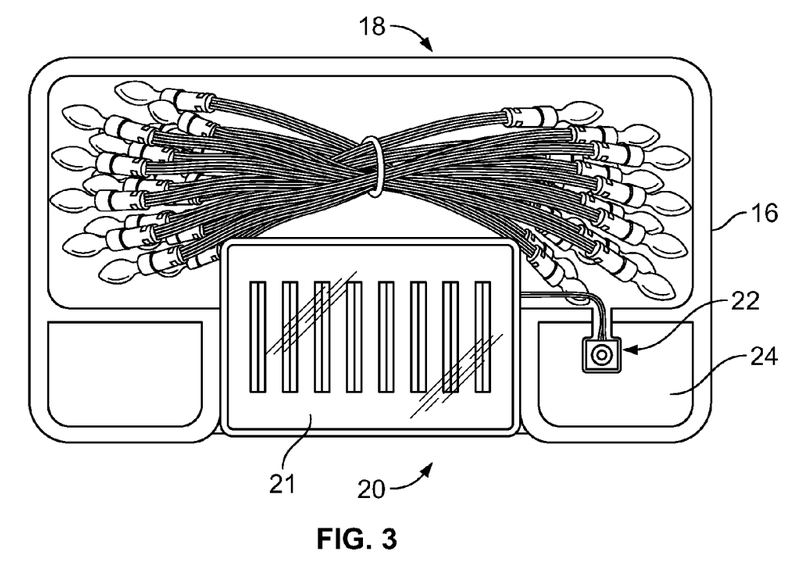
FIG. 3 is a top plan view of internal support within the box shown in FIG. 1.

FIG. 3 shows the box 10 with outer portion removed and revealing the internal contents and packaging. The internal packaging includes a plastic tray 16. The tray 16 supports a string of LED lights 18, interconnected to a photovoltaic array 20. The photovoltaic array 20 is interconnected to a micro-switch 22. The micro-switch 22 is preferably in a raised portion 24 of the tray 16. The raised portion 24 holds the micro-switch 22 against the cover of the box 10. Thus, when a consumer presses the "try me" portion 14 of the box 10, micro-switch 22 closes.

The photovoltaic array 20 preferably includes a plurality of photovoltaic cells 21. When exposed to, e.g., sunlight, the photovoltaic cells 21 produce a voltage which is used to recharge rechargeable batteries (see 42 FIG. 6B) within the photovoltaic array 20.

Figure 4:
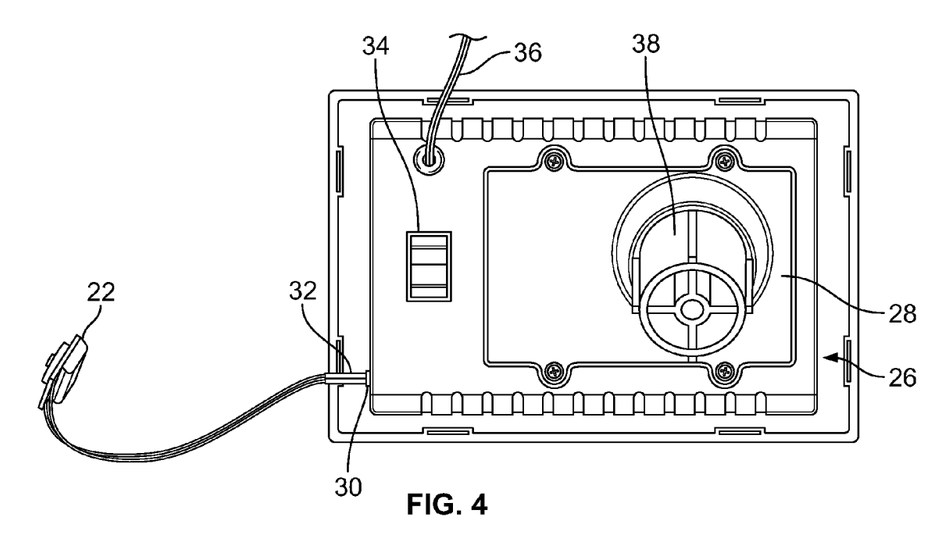
FIG. 4 is a bottom plan view of the photovoltaic array and micro-switch of the system of FIG. 3.
Figure 5:
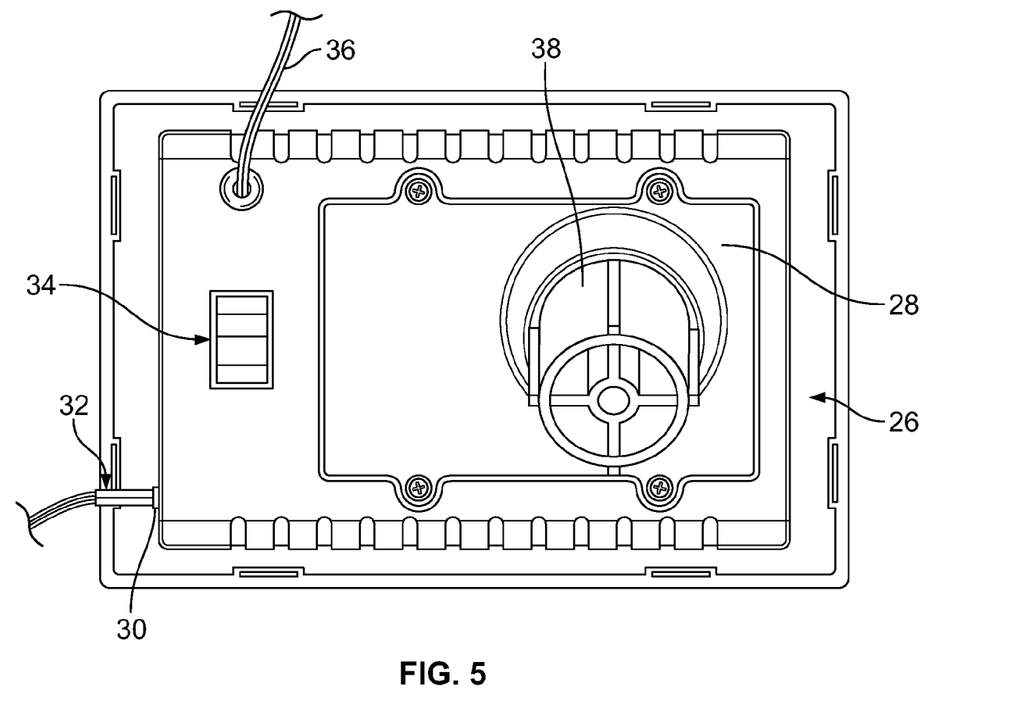
FIG. 5 is a partial view of the photovoltaic array of FIG. 4.

The back 26 of the box 10 is shown in FIGS. 4 and 5. The back 26 includes a cover 28 held on by screws or the like, as well as a receptacle 30 for two leads 32 extending from a wire connected to the micro-switch 22. The back 26 of the photovoltaic array also includes an off/on switch 34 which can be used to activate or deactivate the ability of the photovoltaic array to charge rechargeable batteries (see 42 FIG. 6B) within the photovoltaic array 20. Such batteries store power to illuminate the LED lights 18 via wires 36. The cover 28 also includes an extension 38 protruding from the back 26 of the photovoltaic array 20.

Figure 6A:
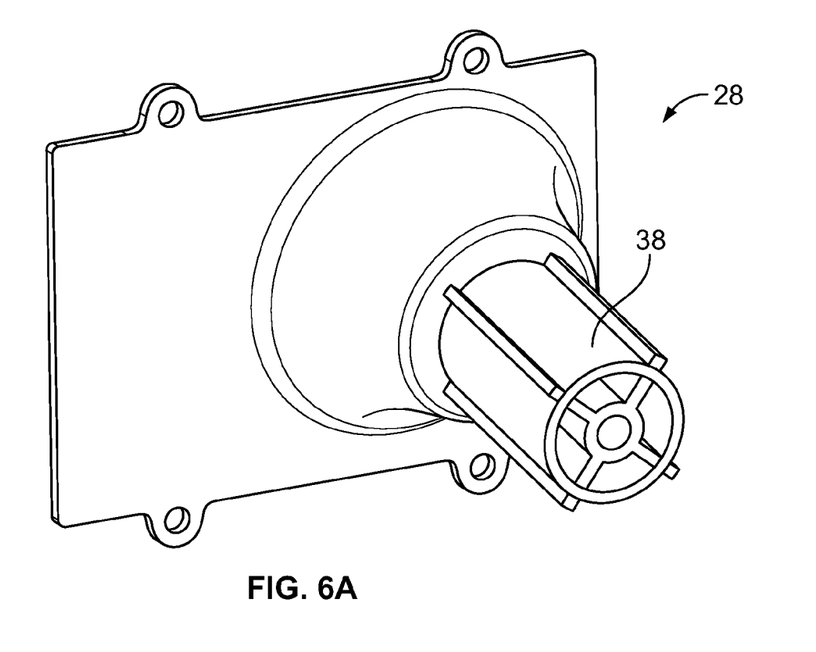
FIGS. 6A and 6B are bottom views of the photovoltaic array of FIG. 5 with the mounting bracket and cover removed, with FIG. 6B showing the interior of the unit.
Figure 6B:
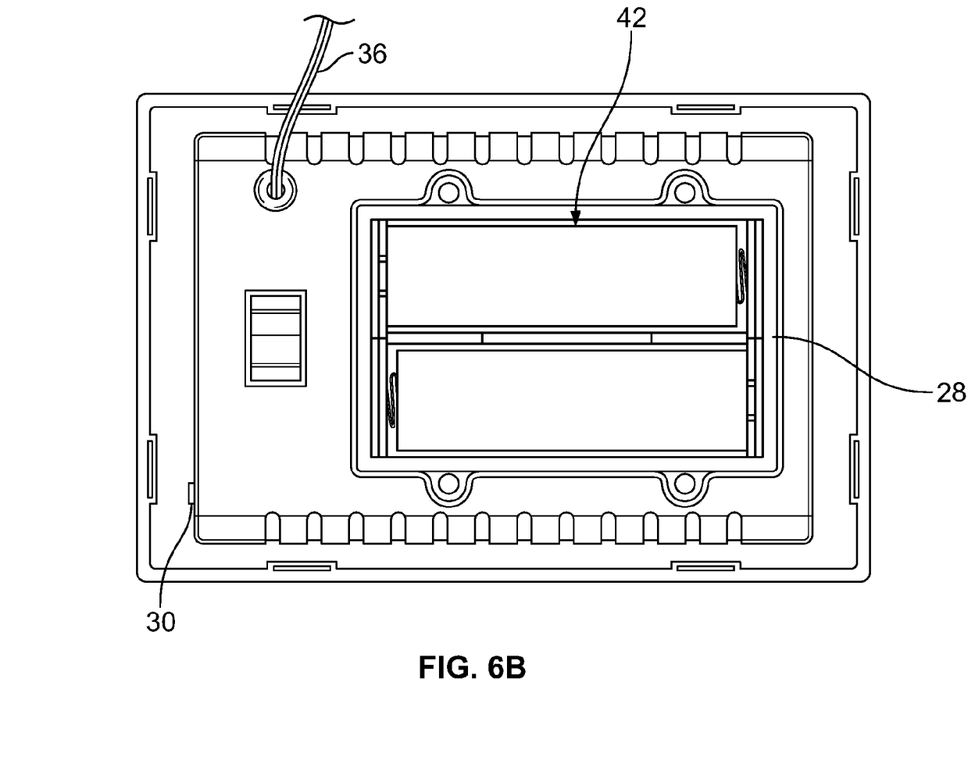

FIG. 6A shows the cover 28 as removed and separate from the back 26 of the photovoltaic array 20. FIG. 6B shows the photovoltaic array 20 with cover 28 removed, and two rechargeable batteries 42 are shown.

Figure 7:
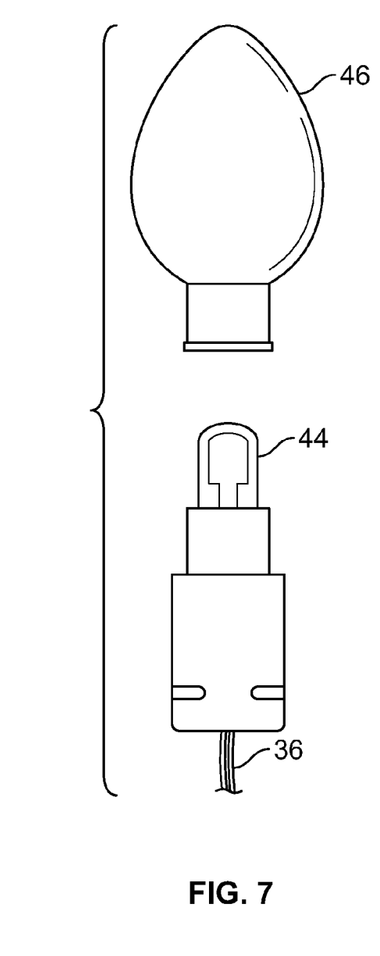
FIG. 7 depicts an LED and diffusing assembly used with the system of FIG. 1.
Figure 8:
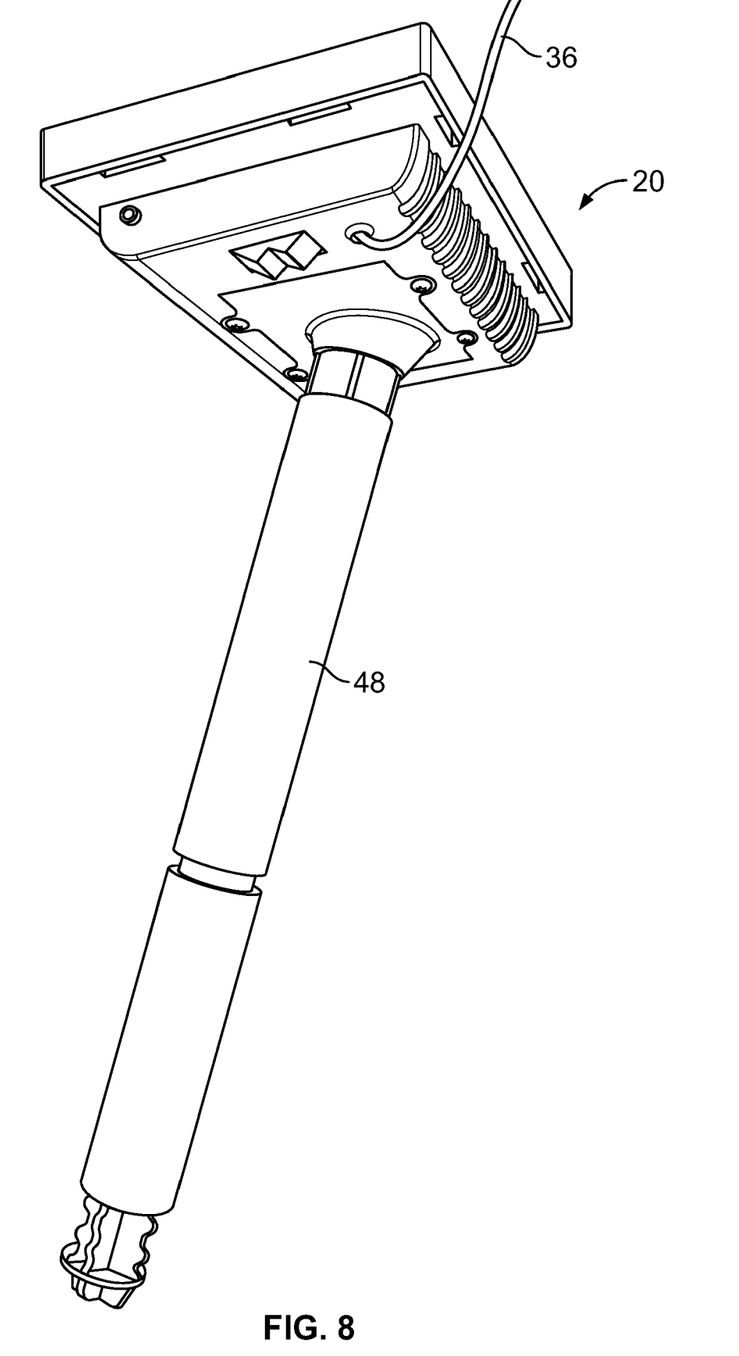
FIG. 8 is the photovoltaic array of FIG. 6 with a ground stake attached.

The wires 36 are interconnected to a series of LED lights 18. An example of an LED light is shown FIG. 7. The arrangement includes an LED 44 and a friction-fit light diffuser 46, which can be snugly placed over the LED 44. As shown in FIG. 8, a ground stake 48 can be applied to the protrusion 38 (see FIG. 9), so that the photovoltaic array 20 may be stuck into the ground or a similar media.

Figure 9:
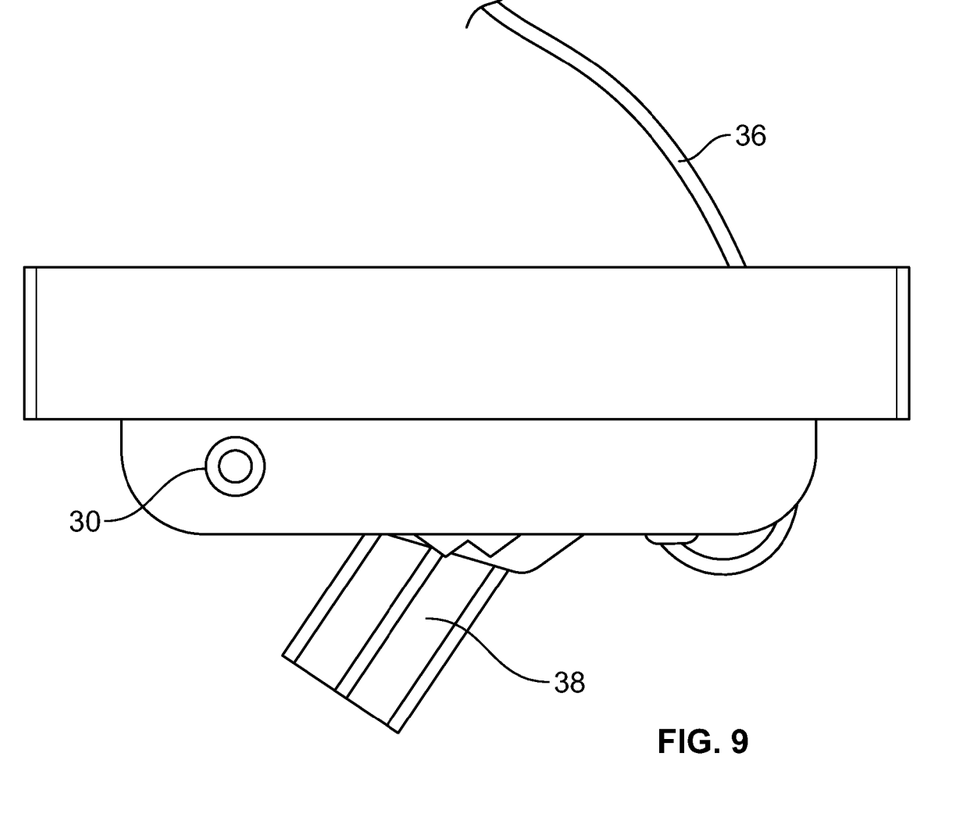
FIG. 9 is a side view of the photovoltaic array of FIGS. 6A and 6B.

The side view of the photovoltaic array 20 is shown in FIG. 9. The side view discloses both the protrusion 38 for the ground stake 48 (see FIG. 8), as well as receptacle 30 for the leads 32 from the micro-switch 22.

Figure 10:
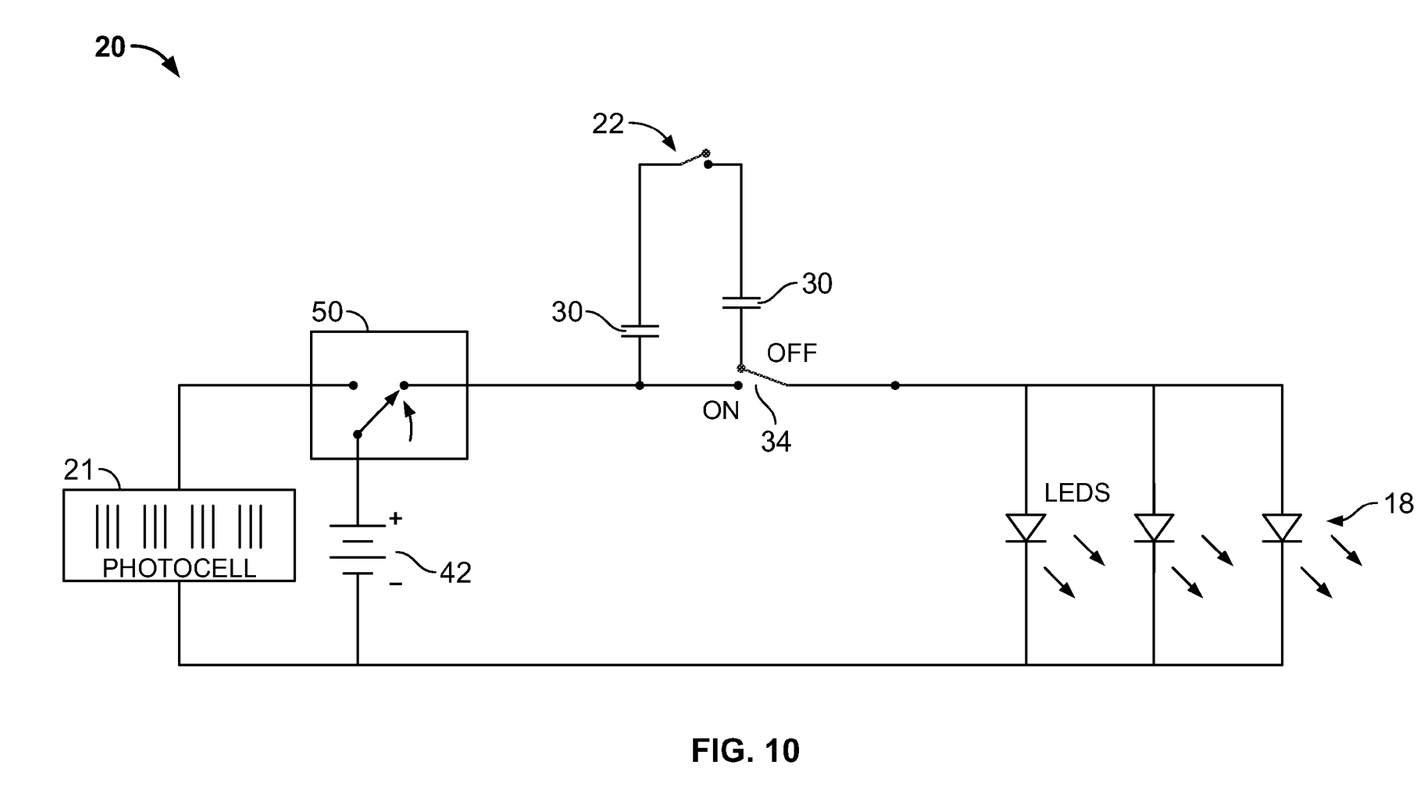
FIG. 10 is a circuit diagram of the control circuitry within the photovoltaic array of FIG. 6.

The circuitry associated with the photovoltaic array 20 is shown in FIG. 10. The photovoltaic cells 21 generate electrical power to charge the rechargeable batteries 42. In operation, when the switch 34 in the off position, the leads 32 may be inserted into the receptacle 30 of the photovoltaic array 20. When the micro-switch 22 is depressed by pressing the "try me" portion 14 of the box 10, power is supplied from the primary rechargeable batteries 42 to the LEDs 18 so that they light.

Thus, in operation, the main rechargeable batteries 42 are used to power all of the LEDs or substantially all the LEDs 18 upon activation of the "try me" switch 22. No supplemental battery is required to light some or all of the LEDs 18. The primary battery that is used is intended to be used throughout the life of the device is utilized to turn on the electrical lights during the in-store display.

When the micro-switch 22 is removed by the consumer (and likely disposed of with the rest of the packaging for the device), the switch 34 then controls whether any power is supplied to the LED lights 18.

With the switch 34 in the on position, a switch 50 controls whether power from the batteries 42 flows to the LEDs 18 or, alternatively whether power from the photovoltaic cells 21 flows into the rechargeable batteries 42. The position of the switch 50 may be changed depending on, for example, whether or not the photovoltaic array detects light, and thus is generating a voltage. If so, it will switch on to recharge the battery. If the photovoltaic cells 21 do not sense light (such as sunlight), switch 50 changes state, so that power from batteries 42 may flow to the LEDs.

While the internal switch 50 in the embodiment shown is dependent upon whether or not it senses a voltage being generated by the photovoltaic cells 21, the state of the switch 50 also could be dependent on other factors, such as, for example, the voltage of the batteries 42.

With the present system, there is only one disposable electrical component: the micro-switch 22. No supplemental battery (or other battery to be used primarily for display purposes) is required. As a result, the cost of the packaging for the device is reduced. Moreover, upon depressing the micro-switch 22, a potential customer is able to see the entire string of lights (or a substantial portion of lights) illuminated rather than only one or two. Because the system uses a robust battery instead of a supplemental battery, the display performance of the system in the package is enhanced and may enhance the consumer appeal of the product.

An exemplary embodiment has been described above. Those afforded the skill in the art will understand whoever the changes and modifications may be made to the embodiment without departing from the true scope and spirit of the invention.

I claim:

1. A packaging system comprising:
   a package structure configured to serve as a package for both an electrical device and a power system for the electrical device, wherein the power system for the electrical device comprises:
      a rechargeable power source;
      a photovoltaic array comprising one or more photovoltaic cells, wherein the photovoltaic array is interconnected to the rechargeable power source via a first switch, and wherein deactivation of the first switch allows the photovoltaic array to charge the rechargeable power source; and
      an on/off switch that controls, at least in part, whether the rechargeable power source provides power to the electrical device; and
   a second switch that is attached to the package structure and can be activated via a first feature of the package structure;
   wherein, if the on/off switch is switched off, then (a) the rechargeable power source is connectable to the electrical device via both the first switch and the second switch and (b) activation of both the first and second switch connects the rechargeable power source to the electrical device such that the rechargeable power source provides power to the electrical device;
   wherein, if the on/off switch is switched on, then (a) the rechargeable power source is connectable to the electrical device via the first switch and (b) activation of the first switch connects the rechargeable power source to the electrical device such that the rechargeable power source provides power to the electrical device.

2. The packaging system of claim 1, wherein the first feature of the package structure comprises a "try me" portion of the package structure.

3. The packaging system of claim 1, wherein the first feature of the package structure comprises a hole in the package structure, wherein the hole provides access to a user interface feature for activating the second switch.

4. The packaging system of claim 1, wherein the package structure comprises a box.

5. The packaging system of claim 1, wherein the package structure comprises a portion that makes at least part of the electrical device visible.

6. A packaging system comprising:
   a package structure configured to serve as a package for both an electrical device and a power system for the electrical device, wherein the power system for the electrical device comprises:
      a rechargeable power source;
      a photovoltaic array comprising one or more photovoltaic cells, wherein the photovoltaic array is interconnected to the rechargeable power source via a first switch, and wherein deactivation of the first switch allows the photovoltaic array to charge the rechargeable power source; and
      an on/off switch that controls, at least in part, whether the rechargeable power source provides power to the electrical device; and
   a second switch that is attached to the package structure and can be activated via a first feature of the package structure;
   wherein, if the on/off switch is switched off, then (a) the rechargeable power source is connectable to the electrical device via both the first switch and the second switch and (b) activation of both the first and second switch connects the rechargeable power source to the electrical device such that the rechargeable power source provides power to the electrical device;
   wherein, if the on/off switch is switched on, then (a) the rechargeable power source is connectable to the electrical device via the first switch and (b) activation of the first switch connects the rechargeable power source to the electrical device such that the rechargeable power source provides power to the electrical device;
   wherein the electrical device comprises a string of lights.

7. The packaging system of claim 6, wherein the string of lights comprises either (a) a plurality of LED lights or (b) a plurality of incandescent lights.

8. The packaging system of claim 1, wherein a back surface of the photovoltaic array comprises a protrusion for attachment of a ground stake to the photovoltaic array.

9. The packaging system of claim 1:
   wherein, if the photovoltaic array senses at least a threshold amount of light, then the first switch is deactivated, thereby allowing the photovoltaic array to charge the rechargeable power source; and
   wherein, if the photovoltaic array does not sense at least the threshold amount of light, then the first switch is activated, thereby allowing the rechargeable power source to provide power to the electrical device.

10. A packaging system comprising:
  a package structure configured to serve as a package for an electrical device and a power system for the electrical device, wherein the power system for the electrical device comprises:
    a rechargeable power source; and
    a photovoltaic array comprising one or more photovoltaic cells, wherein the photovoltaic array is interconnected to the rechargeable power source via a first switch, wherein deactivation of the first switch allows the photovoltaic array to charge the rechargeable power source; and
  a second switch that is attached to the package structure and can be activated via a first feature of the package structure, wherein the rechargeable power source is connectable to the electrical device via both the first switch and the second switch;
  wherein activation of both the first and second switch interconnects the rechargeable power source to the electrical device such that the rechargeable power source provides power to the electrical device.

11. The packaging system of claim 10, wherein the first feature of the package structure comprises a "try me" portion of the package structure.

12. The packaging system of claim 10, wherein the first feature of the package structure comprises a hole in the package structure, wherein the hole provides access to a user interface feature for activating the second switch.

13. A packaging system comprising:
  a package structure configured to serve as a package for an electrical device and a power system for the electrical device, wherein the power system for the electrical device comprises:
    a rechargeable power source; and
    a photovoltaic array comprising one or more photovoltaic cells, wherein the photovoltaic array is interconnected to the rechargeable power source via a first switch, wherein deactivation of the first switch allows the photovoltaic array to charge the rechargeable power source; and; and
  a second switch that is attached to the package structure and can be activated via a first feature of the package structure, wherein the rechargeable power source is connectable to the electrical device via both the first switch and the second switch;
  wherein activation of both the first and second switch interconnects the rechargeable power source to the electrical device such that the rechargeable power source provides power to the electrical device,
  wherein removable leads connect the second switch between the first switch and the electronic device, and wherein, when the removable leads are removed, the second switch is disconnected from the rechargeable power source and the electronic device such that activation of the first switch connects the rechargeable power source to the electrical device such that the rechargeable power source provides power to the electrical device.

14. The packaging system of claim 10, wherein the package structure comprises a box.

15. The packaging system of claim 10, wherein the package structure comprises a portion that makes at least part of the electrical device visible.

16. A packaging system comprising:
  a package structure configured to serve as a package for an electrical device and a power system for the electrical device, wherein the power system for the electrical device comprises:
    a rechargeable power source; and
    a photovoltaic array comprising one or more photovoltaic cells, wherein the photovoltaic array is interconnected to the rechargeable power source via a first switch, wherein deactivation of the first switch allows the photovoltaic array to charge the rechargeable power source; and; and
  a second switch that is attached to the package structure and can be activated via a first feature of the package structure, wherein the rechargeable power source is connectable to the electrical device via both the first switch and the second switch;
  wherein activation of both the first and second switch interconnects the rechargeable power source to the electrical device such that the rechargeable power source provides power to the electrical device,
  wherein the electrical device comprises a string of lights.

17. The packaging system of claim 16, wherein the string of lights comprises either (a) a plurality of LED lights or (b) a plurality of incandescent lights.

18. The packaging system of claim 10, wherein a back surface of the photovoltaic array comprises a protrusion for attachment of a ground stake to the photovoltaic array.

19. The packaging system of claim 10:
  wherein, if the photovoltaic array senses at least a threshold amount of light, then the first switch is deactivated, thereby allowing the photovoltaic array to charge the rechargeable power source; and
  wherein, if the photovoltaic array does not sense at least the threshold amount of light, then the first switch is activated, thereby allowing the rechargeable power source to provide power to the electrical device.

20. The packaging system of claim 13, wherein the second switch is a disposable switch that may be disposed of with the packaging structure when the electrical device is removed from the packaging structure, and if the second switch is deactivated, power may still be provided to the electrical device through the first switch.

21. The packaging system of claim 1, wherein removable leads connect the second switch between the first switch and the electronic device, and wherein, when the removable leads are removed, the second switch is disconnected from the rechargeable power source and the electronic device such that activation of the first switch connects the rechargeable power source to the electrical device such that the rechargeable power source provides power to the electrical device.

22. The packaging system of claim 21, wherein the second switch is a disposable switch that may be disposed of with the packaging structure when the electrical device is removed from the packaging structure, and if the second switch is deactivated, power may still be provided to the electrical device through the first switch.

* * * * *